(12) United States Patent
Li et al.

(10) Patent No.: US 11,662,602 B2
(45) Date of Patent: May 30, 2023

(54) ACTIVE ALIGNMENT FOR ASSEMBLING OPTICAL DEVICES

(71) Applicant: YUTOU TECHNOLOGY (HANGZHOU) CO., LTD., Hangzhou (CN)

(72) Inventors: Kun Li, San Carlos, CA (US); Da Wei, San Carlos, CA (US); Jingtao Zhu, San Carlos, CA (US); Liang Guan, San Carlos, CA (US); Adrian Lake, San Carlos, CA (US); Yi Rao, San Carlos, CA (US)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 17/933,970

(22) Filed: Sep. 21, 2022

(65) Prior Publication Data

US 2023/0016649 A1    Jan. 19, 2023

Related U.S. Application Data

(63) Continuation of application No. 16/299,083, filed on Mar. 11, 2019, now Pat. No. 11,487,132.
(Continued)

(51) Int. Cl.
*H04B 10/00* (2013.01)
*G02B 27/64* (2006.01)
(Continued)

(52) U.S. Cl.
CPC ............ *G02B 27/64* (2013.01); *G01B 11/272* (2013.01); *G02B 6/4214* (2013.01);
(Continued)

(58) Field of Classification Search
CPC combination set(s) only.
See application file for complete search history.

(56) References Cited

U.S. PATENT DOCUMENTS 4,711,544 A * 12/1987 Iino ..................... G02B 27/0101
353/69
5,731,902 A * 3/1998 Williams ............ G02B 27/0101
359/201.1
(Continued)

FOREIGN PATENT DOCUMENTS

DE    10046019 A1 * 3/2002 ......... G02B 27/0025
DE    10334720 A1 * 3/2005 ............. B60K 35/00
(Continued)

*Primary Examiner* — Agustin Bello
(74) *Attorney, Agent, or Firm* — Getech Law LLC; Jun Ye (57) ABSTRACT

Aspects for active alignment for assembling optical imaging systems are described herein. As an example, the aspects may include aligning an optical detector with an optical component. The optical component is configured to alter a direction of one or more light beams emitted from an image displayed by an optical engine. The aspects may further include detecting, by the optical detector, a virtual image generated by the one or more light beams emitted by the optical engine; and adjusting, by a multi-axis controller, an optical path of the one or more light beams based on one or more parameters of the virtual image collected by the optical detector.

7 Claims, 8 Drawing Sheets

Related U.S. Application Data (60) Provisional application No. 62/759,916, filed on Nov. 12, 2018.

(51) Int. Cl.
| | | |
|---|---|---|
| *G06T 7/70* | (2017.01) | |
| *G01B 11/27* | (2006.01) | |
| *G02B 6/42* | (2006.01) | |
| *G02B 27/01* | (2006.01) | |
| *G06T 3/20* | (2006.01) | |

(52) U.S. Cl.
CPC ....... *G02B 6/4227* (2013.01); *G02B 27/0179* (2013.01); *G06T 3/20* (2013.01); *G06T 7/70* (2017.01); *G02B 2027/0181* (2013.01)

(56) References Cited

U.S. PATENT DOCUMENTS

| | | | | |
|---|---|---|---|---|
| 7,136,090 B1 * | 11/2006 | McDuffie White | .... | H04N 7/144 |
| | | | | 348/E13.058 |
| 7,671,851 B1 * | 3/2010 | Pryor | .................... | G06F 3/0312 |
| | | | | 345/184 |
| 7,806,533 B2 * | 10/2010 | Boute | .................... | H04N 7/144 |
| | | | | 353/30 |
| 8,497,880 B2 * | 7/2013 | Victor | ................ | G01C 21/3697 |
| | | | | 345/660 |
| 8,629,903 B2 * | 1/2014 | Seder | .................... | G02B 27/01 |
| | | | | 348/113 |
| 9,513,600 B2 * | 12/2016 | Sugiyama | ........... | G02B 27/017 |
| 9,658,450 B2 * | 5/2017 | Ichinokawa | ....... | G02B 27/0149 |
| 9,794,552 B1 * | 10/2017 | Ribble | ................ | H04N 17/002 |
| 9,891,516 B1 * | 2/2018 | DeVaul | ................ | H04N 9/3129 |
| 9,961,333 B1 * | 5/2018 | Adolf | ................ | G03B 21/606 |
| 10,021,379 B2 * | 7/2018 | Bridges | .................. | G01S 17/86 |
| 10,091,496 B2 * | 10/2018 | DeVaul | ................ | H04N 9/3147 |
| 10,156,720 B2 * | 12/2018 | Ando | .................... | G06V 20/58 |
| 10,587,849 B2 * | 3/2020 | Hayashi | ............ | G02B 27/0101 |
| 10,668,857 B2 * | 6/2020 | Takiguchi | ............. | G02B 30/40 |
| 10,670,808 B1 * | 6/2020 | Trail | ...................... | G02B 6/122 |
| 10,712,548 B2 * | 7/2020 | Ward | ................. | G02B 21/367 |
| 10,775,621 B2 * | 9/2020 | Wunderwald | .......... | G02B 27/01 |
| 10,775,633 B1 * | 9/2020 | Lee | ................... | G02B 27/0179 |
| 10,845,591 B2 * | 11/2020 | Cai | ........................ | G02B 13/18 |
| 11,099,387 B2 * | 8/2021 | Poulad | ................ | H04N 13/128 |
| 11,175,457 B1 * | 11/2021 | Trail | ...................... | G02B 6/122 |
| 11,275,250 B2 * | 3/2022 | Chen | ...................... | G02B 7/005 |
| 2006/0072076 A1 * | 4/2006 | Smoot | .................. | H04N 13/363 |
| | | | | 353/34 |
| 2008/0062420 A1 * | 3/2008 | Okamuro | ............... | B41J 2/1623 |
| | | | | 356/401 |
| 2008/0192312 A1 * | 8/2008 | Hendricks | ............ | G03H 1/0808 |
| | | | | 359/13 |
| 2009/0033926 A1 * | 2/2009 | Haug | ....................... | G06T 7/80 |
| | | | | 356/243.1 |
| 2012/0212400 A1 * | 8/2012 | Border | ............... | G02B 27/0172 |
| | | | | 345/8 |
| 2013/0120825 A1 * | 5/2013 | Lambert | ............ | G02B 27/0101 |
| | | | | 359/290 |
| 2014/0268359 A1 * | 9/2014 | Yuki | ...................... | G02B 5/205 |
| | | | | 359/630 |
| 2015/0108782 A1 * | 4/2015 | Chou | .................. | G02B 27/0101 |
| | | | | 296/90 |
| 2015/0198802 A1 * | 7/2015 | Ando | ................. | G02B 27/0905 |
| | | | | 359/200.8 |
| 2015/0317838 A1 * | 11/2015 | Foxlin | .................... | G06T 19/006 |
| | | | | 345/633 |
| 2016/0085084 A1 * | 3/2016 | Masson | ............... | G02B 26/0833 |
| | | | | 353/30 |
| 2016/0187654 A1 * | 6/2016 | Border | ............... | G02B 27/0172 |
| | | | | 359/630 |
| 2016/0327796 A1 * | 11/2016 | Bailey | .................. | G03H 1/2645 |
| 2016/0349510 A1 * | 12/2016 | Miller | .................. | H04N 13/128 |
| 2017/0195647 A1 * | 7/2017 | Honkanen | ............ | G03B 21/147 |
| 2018/0143682 A1 * | 5/2018 | Larson | ................ | G02B 27/0172 |
| 2018/0160087 A1 * | 6/2018 | Nill | ...................... | H04N 9/3194 |
| 2019/0212554 A1 * | 7/2019 | Kikuchi | ............. | G02B 27/0101 |
| 2019/0278094 A1 * | 9/2019 | Huang | .................... | G06F 3/013 |
| 2020/0082570 A1 * | 3/2020 | Wunderwald | .......... | G02B 27/62 |
| 2020/0150451 A1 * | 5/2020 | Li | ........................ | G02B 6/4227 |
| 2020/0174284 A1 * | 6/2020 | Chan | ................ | G02B 27/0179 |
| 2020/0278544 A1 * | 9/2020 | Poulad | .................... | G02B 27/18 |

FOREIGN PATENT DOCUMENTS

| | | | | | |
|---|---|---|---|---|---|
| DE | 102005037797 A1 | * | 2/2007 | ............ | B60K 35/00 |
| DE | 102005037797 B4 | * | 6/2011 | ............ | B60K 35/00 |
| DE | 102011075703 A1 | * | 11/2012 | ............ | G02B 27/01 |
| DE | 102017100676 A1 | * | 7/2018 | ......... | G02B 27/0101 |
| EP | 3496041 A1 | * | 6/2019 | ............ | G02B 27/0172 |
| WO | WO-2012152475 A1 | * | 11/2012 | ............ | G02B 27/01 |
| WO | WO-2014167119 A2 | * | 10/2014 | ......... | G02B 27/0101 |
| WO | WO-2015044280 A1 | * | 4/2015 | ............ | G02B 27/01 |

\* cited by examiner

ACTIVE ALIGNMENT FOR ASSEMBLING OPTICAL DEVICES

CROSS-REFERENCE TO RELATED APPLICATIONS

This application is a continuation of U.S. patent application Ser. No. 16/299,083, filed Mar. 11, 2019, which claims the benefit and priority of U.S. Provisional Application No. 62/759,916, filed Nov. 12, 2018. The contents of each of the above-captioned patent applications are hereby expressly incorporated herein by reference in their entireties.

BACKGROUND

As augmented reality (AR) and/or virtual reality (VR) devices that include eyewear, headsets enter the era of mass production, it imminently needs a standard hardware system that can be tweaked to perform general assembly for devices with different optical designs. A conventional assembly method of AR/VR imaging systems only relies on mechanical housings to fix optical components at their designed positions. Because near-eye imaging system is sensitive to the variations of individual optical components in production and the tolerance of mechanical housing, some resulting near-eye imaging systems may not reach the perfect condition as designed. Further, the variations of individual optical components may cause the inconsistency of optical performance among individual products. Both largely deteriorate the user experience of AR/VR products.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example method for active alignment for assembling optical imaging systems. The example method may include aligning an optical detector with an optical component. The optical component may be configured to alter a direction of one or more light beams emitted from an image displayed by an optical engine. The example method may further include detecting, by the optical detector, a virtual image generated by the one or more light beams emitted by the optical engine. Further still, the example method may include adjusting, by a multi-axis controller, an optical path of the one or more light beams based on one or more parameters of the virtual image collected by the optical detector.

Another example aspect of the present disclosure provides an example system of active alignment for assembling optical imaging systems. The example system may include an optical engine configured to display an image; and an optical component configured to alter a direction of one or more light beams emitted from the image. Further, the example system may include an optical detector aligned with at least one component of the optical system. The optical detector may be configured to detect a virtual image generated by the one or more light beams emitted by the optical engine. Further still, the example system may include a multi-axis controller configured to adjust an optical path of the one or more light beams based on one or more parameters of the virtual image collected by the optical detector.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

A wearable AR/VR device, e.g., AR/VR goggles, typically may include an optical engine configured to display information such as texts, images, videos. The displayed information may be shown adjacent to real objects in a user's view when the user wears the AR/VR device. For example, when the user looks at a movie theater, a movie schedule may be shown adjacent to the movie theater in the user's view such that the user may not need to search the movie schedule via his/her smartphone. Typically, the information is displayed on an optical component of the AR/VR device, e.g., lens of the AR/VR goggles. Because of the sensitivity of human eyes, the relative position between the optical engine and the optical component may be carefully aligned during assembly process.

In the active alignment process described below, the optical engine may be adjusted dynamically based on an image captured by an optical detector. That is, during the active alignment process, the optical engine may be configured to display a standard image that may be captured by the optical detector. Based on parameters of the captured image, e.g., contrast, a computing device may be configured to control the position of the optical engine and to further adjust the optical engine to an optimal position.

Figure 1A:
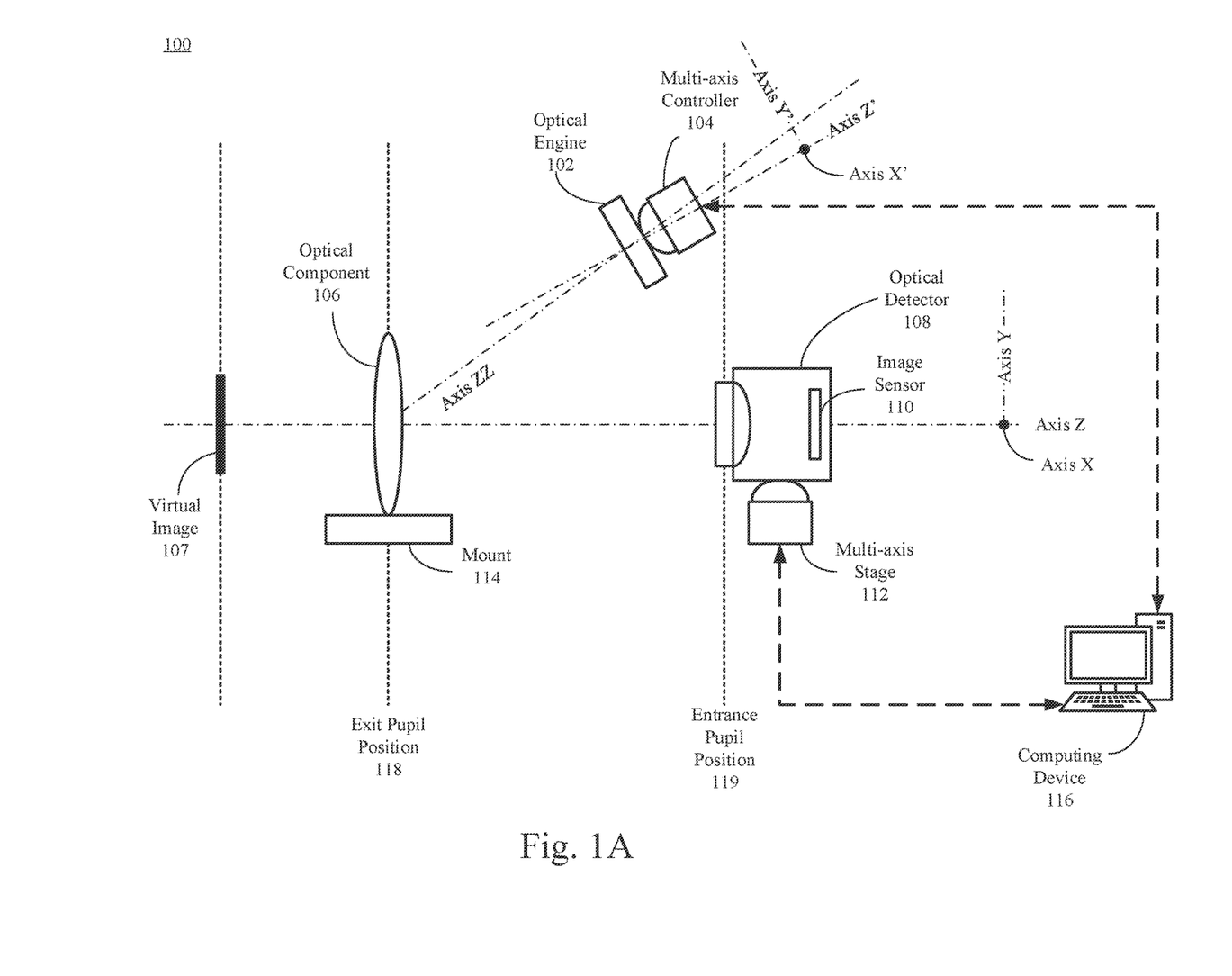
FIG. 1A illustrates a system diagram of an example system for active alignment for assembling optical imaging systems.

FIG. 1A illustrates a system diagram of an example system 100 for active alignment for assembling optical imaging systems. As depicted, the example system 100 may include an optical engine 102 mounted to a multi-axis controller 104. The optical engine 102 may refer to a display device configured to display one or more patterns. For example, the optical engine 102 may include an array of organic light emitting diodes (OLED) configured to display the patterns. In some other examples, the optical engine 102 may include a liquid crystal display (LCD) panel configured to display the patterns. The patterns may include an image of multiple black and white stripes or an image of a crosshair. The different patterns may be displayed for purpose of different alignment processes that are described in greater detail below.

The multi-axis controller 104 may refer to a motorized stage that may be configured to move in one or more directions in response to controlling signals from a computing device 116. In other words, the multi-axis controller 104 may have one or more degrees of freedom (DOF). For example, the multi-axis controller 104 may be configured to move backward and forward at a direction perpendicular to a plane of a micro-display of the optical engine 102, e.g., at an axis Z' as shown. In addition, the multi-axis controller 104 may be configured to move up and down at a direction perpendicular to the axis Z', e.g., at an axis Y', and to move left and right at a direction perpendicular to both the axis Z' and the axis Y', e.g., at an axis X' as shown at a black dot in FIG. 1. Further, the multi-axis controller 104 may be configured to move backward and forward at a direction of the light emitted from the optical engine 102, e.g., at an axis ZZ as shown, by moving at the axis Z' and the axis Y' simultaneously.

Further, the multi-axis controller 104 may be configured to respectively swivel left and right at an angle $\theta_{x'}$ and tilt forward and backward at an angle $\theta_{y'}$. The term "forward" here is defined based on the assumption that an end of the multi-axis controller 104 that is attached to the optical engine 102 is a front end of the multi-axis controller 104. Additionally, the multi-axis controller 104 may be configured to rotate clockwise and counterclockwise for a degree of $\theta_{z'}$.

The example system 100 may further include an optical component 106 mounted to a mount 114 and an optical detector 108 attached to a multi-axis stage 112. The optical component 106 may refer to a lens or other devices configured to alter light beams. A combination of the optical engine 102 and the optical component 106 may be included in an AR/VR device that may be alternatively referred to as an optical imaging system 103 hereinafter. Prior to aligning the optical engine 102 with the optical component 106, the optical detector 108 may be aligned with the optical component 106 or the mount 114. That is, a multi-axis stage 112 that carries the optical detector 108 may be configured to align with the optical component 106 or the mount 114. As the multi-axis stage 112 may be configured to move at one or more directions or at multiple degrees of freedom, aligning the optical detector 108 with the optical component 106 (or the mount 114) may include determining positions of the optical detector 108 at an axis X, an axis Y, and an axis Z respectively and determining the degrees that the multi-axis stage 112 swivels, tilts, and rotates. The axis Z may refer to a direction parallel to an optical axis of the lens included in the optical detector 108. The axis Y may refer to a direction perpendicular to the axis Z and the axis X may refer to a direction perpendicular to both the axis Y and the axis Z.

Alignment Between the Optical Detector and the Optical Component

In some examples for determining the position of the optical detector 108 at the axis X and axis Y, the mount 114 may bear a standard mark, e.g., a dot or a cross label. A real image of the standard mark may be produced at the image sensor 110. The optical detector 108 may be configured to continuously or at least periodically capture the real image and generate a digital picture of the standard mark. The optical detector 108 may be further configured to transmit the generated digital picture of the standard mark to a computing device 116. The computing device 116 may be configured to determine whether the image of the standard mark is located at the center of the image sensor 110, that is, to determine whether the image of the dot or the cross label is at the center of generated digital picture since the center of the image sensor 110 typically is the center of the digital image. In some examples, when the computing device 116 determines that the image of the standard mark is within a threshold distance (e.g., a preset number of pixels) from the center of the digital picture, the computing device 116 may be configured to determine that the optical detector 108 is at an acceptable position at the axis X and the axis Y. The acceptable position at the axis X may be referred to as X optimized position. The acceptable position at the axis Y may be referred to Y optimized position.

On the contrary, when the computing device 116 determines that the image of the standard mark is outside the threshold distance from the center of the digital picture, the computing device 116 may be configured to transmit one or more controlling signals to the multi-axis stage 112 to control the movement of the multi-axis stage 112 at the axis X and the axis Y. Subsequent to the multi-axis stage 112 being controlled to move according to the controlling signals, the optical detector 108 may be configured to generate a second digital picture of the standard mark and transmit the second digital picture to the computing device 116 for similar determination. The process may be repeated until the image of the standard mark is within the threshold distance from the center of the generated digital picture.

With respect to the position of the optical detector 108 at the axis Z, the optical detector 108 may be calibrated to a position that an entrance pupil position 119 of the optical detector 108 is overlapped or closest to an exit pupil position 118 of the optical imaging system 103. The exit pupil position 118 may be determined during the optical design process of the optical imaging system 103 prior to the alignment processes described hereafter. Thus, the position of the optical detector 108 may be also predetermined prior to the alignment processes.

Alignment Between the Optical Engine and the Optical Component

When the optical detector 108 is aligned with the optical component 106, the computing device 116 may be configured to control the multi-axis controller 104 to adjust the position of the optical engine 102 such that the optical path of the light emitted from optical engine 102 may be adjusted.

In some examples, the optical engine 102 may be configured to display a predetermined pattern, e.g., a crosshair with linewidth of 6 pixels. Light from the displayed pattern may be reflected by the optical component 106 to form a virtual image 107 of the displayed pattern and may further generate an image at the image sensor 110. Similarly, the optical detector 108 may be configured to record a digital image of the virtual image 107 and further transmit the digital image to the computing device 116. The computing device 116 may be configured to determine whether the center of the virtual image 107, e.g., the center of the crosshair, is at the center of the digital image in order to determine the optimized position of the optical engine 102 at the axis X' and the axis Y'. The determination process at the computing device 116 may be described in accordance with FIG. 1B in greater detail. If the center of the crosshair is not at the center of the digital image, the computing device 116 may be configured to control multi-axis controller 104 to adjust the position of the optical engine 102 at the axis X' and the axis Y' until the center of the crosshair is located with a predetermined threshold distance from the center of the digital image.

Further, when the center of the crosshair is at the center of the digital image, the computing device 116 may be configured to determine whether the two lines of the crosshair are respectively parallel to the edges of the digital image. If not, the computing device 116 may be configured to control the multi-axis controller 104 to rotate the optical engine 102 clockwise or counterclockwise. The rotated degree may be referred to $\theta_{z'}$ optimized position.

Further to the examples, the computing device 116 may be configured to determine the optimized position of the optical engine 102 at the axis Z' based on a virtual image distance. The virtual image distance may refer to the distance between the virtual image 107 and the exit pupil of the optical imaging system 103. When the multi-axis controller 104 controls the optical engine 102 to move at the axis ZZ, the virtual image distance may change. Thus, the virtual image distance may be adjusted in different scenarios by controlling the position of the optical engine 102. In some example scenarios, the virtual image distance may be set to 2 to 4 meters. The corresponding position of the optical engine 102 at the axis ZZ may be referred to the ZZ optimized position. In some examples, the virtual image distance may be measured by the optical detector 108. For instance, the computing device 116 may be configured to control the optical detector 108 to change the focus distance from 0.5 meter to infinity by a predetermined step (e.g., 1 centimeter) and to record digital images at each step. Simultaneously, the computing device 116 may be configured to monitor the contrast of the digital image at each step and to determine the focus distance associated with the highest contrast as the virtual image distance.

In addition, the computing device 116 may be configured to control the multi-axis controller 104 to swivel to a $\theta_{x'}$ optimized position and to tilt to a $\theta_{y'}$ optimized position. In more detail, the optical engine 102 may be configured to display a standard pattern, e.g., an image with black and white stripes according to a predetermined spatial frequency. The virtual image 107 of the standard pattern may be captured and recorded by the optical detector 108. The computing device 116 may be configured to calculate contrast values at different regions of a digital image of the virtual image 107. Based on the contrast values at the different regions, the computing device 116 may be configured to generate controlling signals to adjust the position of the optical engine 102 until the contrast values in different regions of the digital image are within a given range. The process for determining the $\theta_{x'}$ optimized position and the $\theta_{y'}$ optimized position is described in greater detail in accordance with FIG. 1D.

Figure 1B:
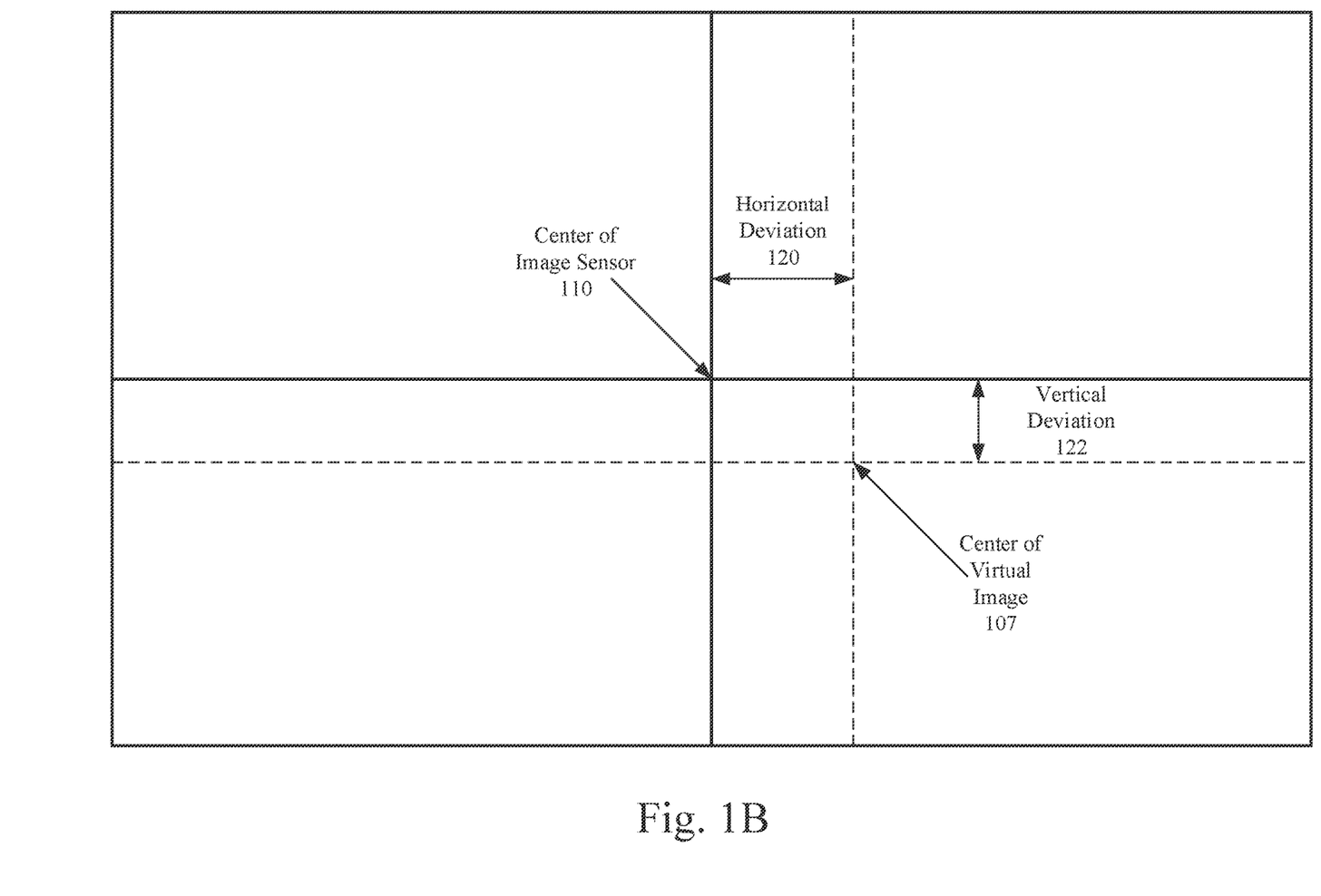
FIG. 1B illustrates an example comparison between a center of an image sensor and a center of a virtual image by which active alignment for assembling optical imaging systems may be implemented.

FIG. 1B illustrates an example comparison between a center of an image sensor and a center of a virtual image by which active alignment for assembling optical imaging systems may be implemented.

As described above in accordance with FIG. 1A, the optical engine 102 may be configured to display the predetermined pattern, e.g., a crosshair with a given linewidth. The virtual image 107 of the crosshair may be captured and recorded as a digital image. Typically, the center of the digital image is the center of the image sensor 110. Thus, the computing device 116 may be configured to determine whether the center of the virtual image 107 is at the center of the digital image. In some examples, the center of the virtual image 107 may be deviated from the center of the digital image horizontally and/or vertically causing a horizontal deviation 120 and a vertical deviation 122. In some examples, the computing device 116 may be configured to determine that the center of the virtual image 107 is not at the center of the digital image when either the horizontal deviation 120 or the vertical deviation 122 is greater than a preset value, e.g., 10 pixels. Based on the determination that the center of the virtual image 107 is not at the center of the digital image, the computing device 116 may be configured to transmit controlling signals to the multi-axis controller 104 to adjust the position of optical engine 102 at the axis Y' and the axis X'.

In some examples, the computing device 116 may be configured to determine whether the two lines of the crosshair are respectively parallel to the edges of the digital image. If the computing device 116 determines that the two lines of the crosshair are not respectively parallel to the edges, the computing device 116 may be configured to transmit controlling signals to the multi-axis controller 104 to rotate the optical engine 102 clockwise or counterclockwise.

Figure 1C:
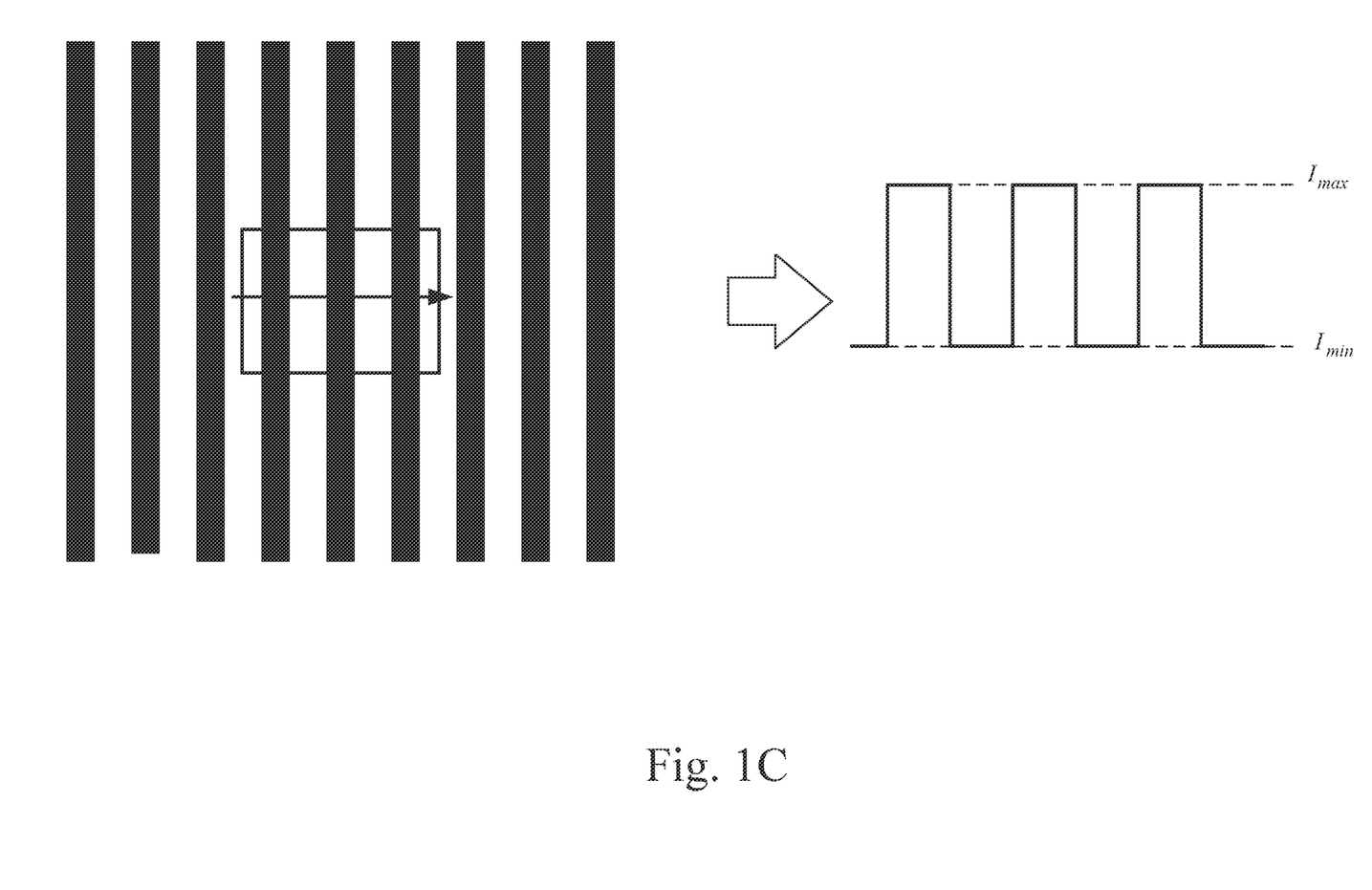
FIG. 1C illustrates an example process to measure a contrast by which active alignment for assembling optical imaging systems may be implemented.

FIG. 1C illustrates an example process to measure a contrast by which active alignment for assembling optical imaging systems may be implemented.

In the examples described above, the optical engine 102 may be configured to display a pattern of black and white stripes according to a given spatial frequency. The optical detector 108 may be configured to record a digital image of the virtual image 107 of the displayed pattern. The computing device 116 may be configured to calculate a contrast value of at least a portion of the digital image. The contrast value here may refer to a Michelson contrast value or other types of contrast values, e.g., Weber contrast, RMS contrast, etc. The Michelson contrast value may be calculated based on the highest and lowest luminance of the portion of the digital image. For example, the Michelson contrast may be calculated according to the formula: $(I_{max}-I_{min})/(I_{max}+I_{min})$, in which $I_{max}$ may refer to the highest luminance and $I_{min}$ may refer to the lowest luminance.

Figure 1D:
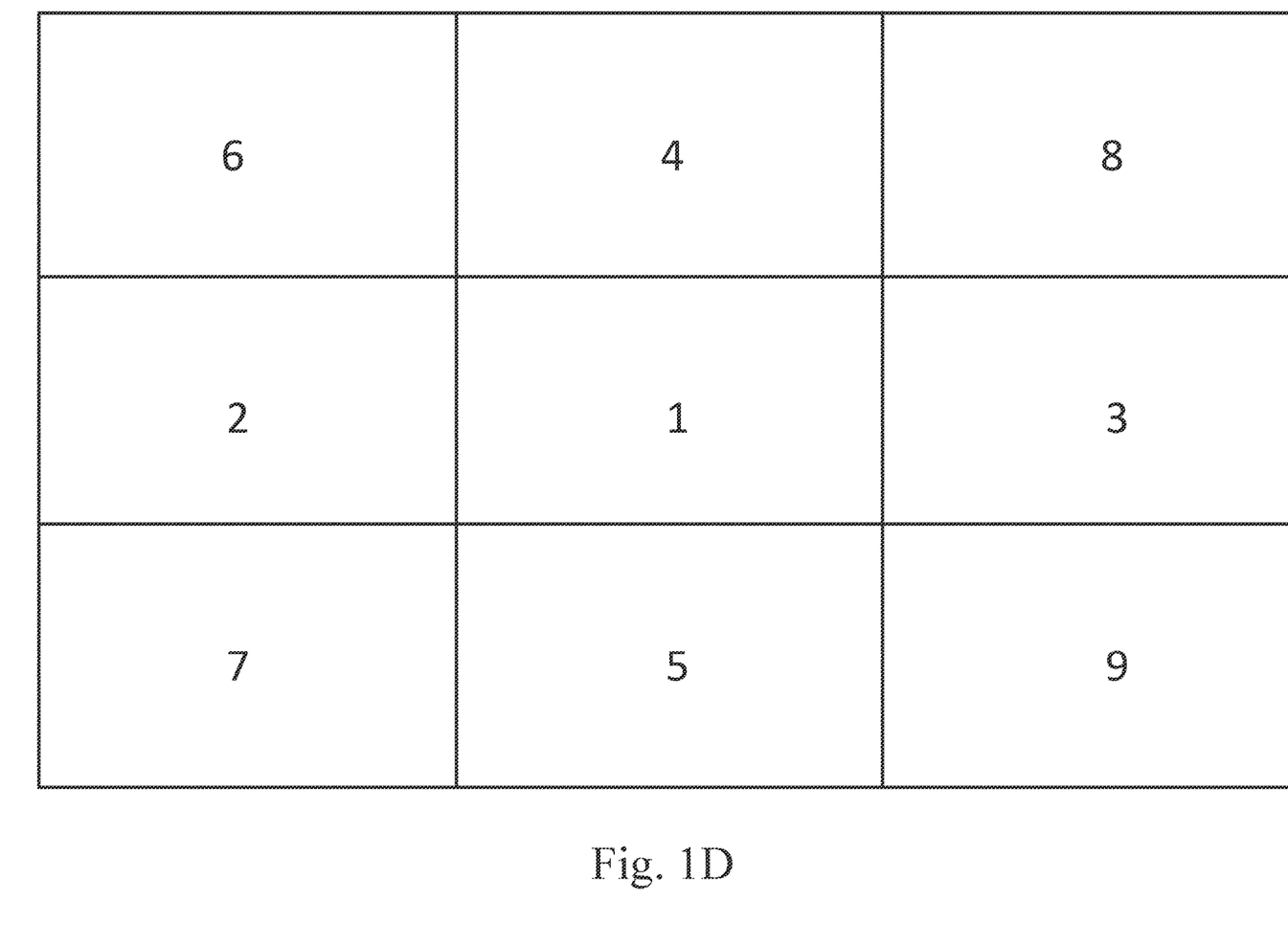
FIG. 1D illustrate an example process to measure a uniformity of contrast of a digital image.

FIG. 1D illustrate an example process to measure a uniformity of contrast of a digital image.

Further to the examples described in accordance with FIG. 1C, the computing device 116 may be configured to calculate multiple contrast values of different portions of the recorded digital image to measure the uniformity of the contrast of the digital image. In a non-limiting example, the computing device 116 may be configured to divide the digital image into nine portions that may be respectively identified by numbers 1 to 9 as shown. Respective contrast values for the nine portions may be calculated by the computing device 116.

In determining the $\theta_{x'}$ optimized position, the computing device 116 may be configured to compare the contrast values between portion 6 and portion 8, portion 2 and portion 3, and portion 7 and portion 9. When the contrast values between each pair of portions of the digital image are within a predetermined difference, e.g., 5%, the computing device 116 may be configured to determine the current position as the $\theta_{x'}$ optimized position. Otherwise, the computing device 116 may be configured to transmit controlling signals to the multi-axis controller 104 to swivel until the contrast values between each pair of portions are within the predetermined difference.

In determining the $\theta_{y'}$ optimized position, the computing device 116 may be configured to compare the contrast values between portion 6 and portion 7, portion 4 and portion 5, and portion 8 and portion 9. When the contrast values between each pair of portions of the digital image are within a predetermined difference, e.g., 5%, the computing device 116 may be configured to determine the current position as the $\theta_{y'}$ optimized position. Otherwise, the computing device 116 may be configured to transmit controlling signals to the multi-axis controller 104 to tilt until the contrast values between each pair of portions are within the predetermined difference.

Figure 2:
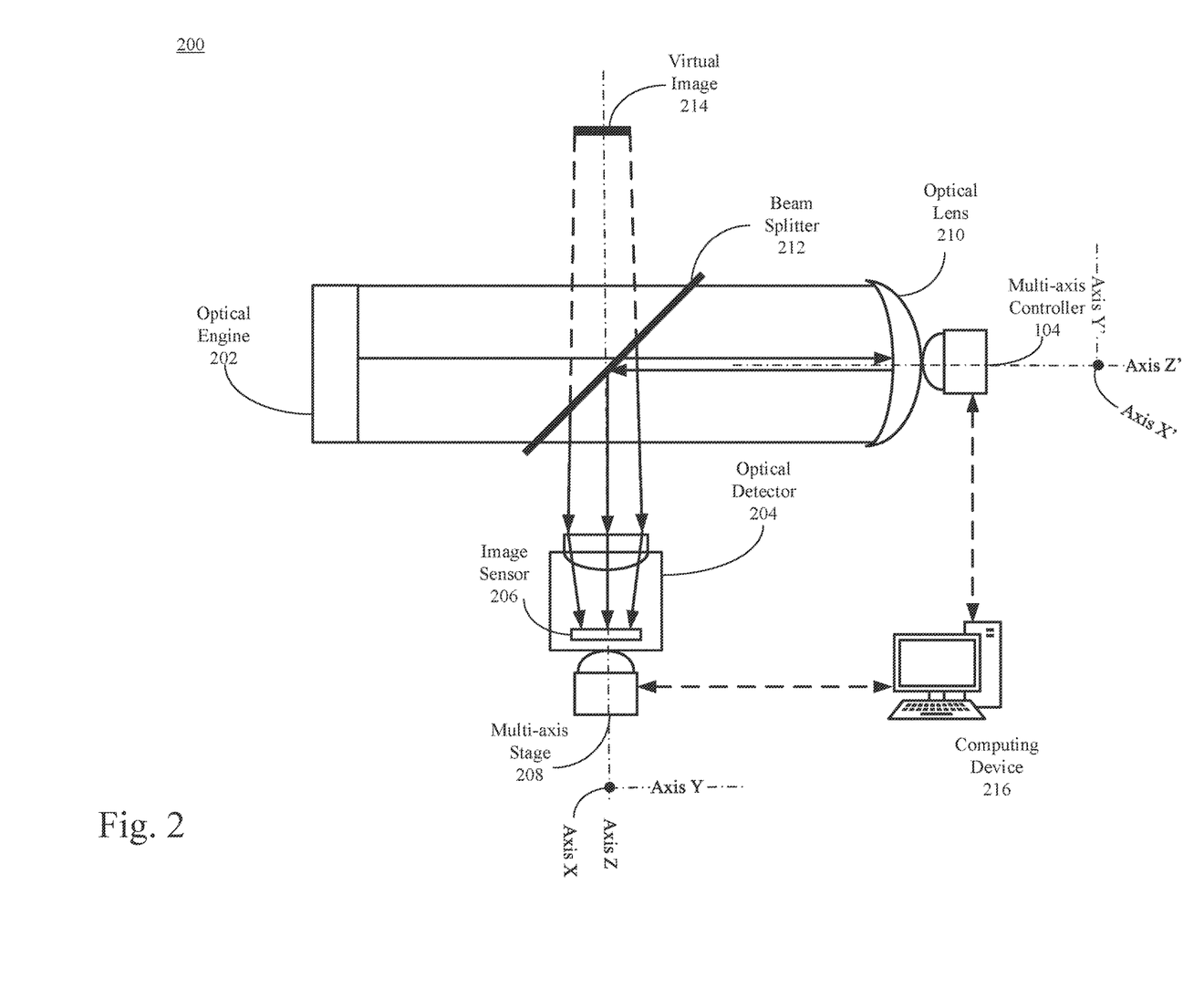
FIG. 2 illustrates another example system in which active alignment for assembling optical imaging systems may be implemented.

FIG. 2 illustrates another example system 200 in which active alignment for assembling optical imaging systems may be implemented.

As depicted, the example system 200 may include an optical engine 202 configured to display one or more patterns, e.g., a crosshair or one or more black and white stripes. The optical engine 202 may also include an LCD panel or an array of OLED to display the patterns. Light from the displayed pattern may travel through a beam splitter and reach an optical lens 210 mounted on the multi-axis controller 104. As described above, the multi-axis controller 104 may be configured to move in one or more directions in response to controlling signals from a computing device 216. For example, the multi-axis controller 104 may be configured to move backward and forward at a direction of the light emitted from the optical engine 202, e.g., at an axis Z' as shown. In addition, the multi-axis controller 104 may be configured to move up and down at a direction perpendicular to the direction of the light emitted from the optical engine 102, e.g., at an axis Y'. The multi-axis controller 104 may be further configured to move left and right at a direction perpendicular to both the axis Z' and the axis Y', e.g., at an axis X' shown as a black dot in FIG. 2.

Further, the multi-axis controller 104 may be configured to respectively swivel left and right at an angle $\theta_{x'}$ and tilt forward and backward at an angle $\theta_{y'}$. The term "forward" here is defined based on the assumption that an end of the multi-axis controller 104 that is attached to the optical lens 210 is a front end of the multi-axis controller 104. Additionally, the multi-axis controller 104 may be configured to rotate clockwise and counterclockwise for a degree of $\theta_{z'}$.

In the example system 200, a beam splitter 212 may be mounted to a mount (not shown) and an optical detector 204 may be attached to a multi-axis stage 208. The beam splitter 212, the optical lens 210, and the optical engine 202 may be included in an AR/VR device that may be alternatively referred to as an optical imaging system 203. Prior to aligning the optical lens 210 with the optical engine 202, the optical detector 204 may be aligned with the beam splitter 212. That is, the multi-axis stage 208 may be configured to adjust the position of the optical detector 204 such that the optical detector 204 is aligned with the beam splitter 212. As the multi-axis stage 208 may be configured to move at one or more directions or at multiple degrees of freedom, aligning the optical detector 204 with the beam splitter 212 may include determining positions of the optical detector 204 at an axis X, an axis Y, and an axis Z respectively and determining the degrees that the multi-axis stage swivels, tilts, and rotates. The axis Z may refer to a direction parallel to an optical axis of the lens included in the optical detector 204. The axis Y may refer to a direction perpendicular to the axis Z and the axis X may refer to a direction perpendicular to both the axis Y and the axis Z.

Similarly, in some examples, the beam splitter 212 may bear a standard mark, e.g., a dot or a cross label. A real image of the standard mark may be produced at an image sensor 206 of the optical detector 204. The optical detector 204 may be configured to continuously or at least periodically capture the real image and generate a digital picture of the standard mark. The optical detector 204 may be further configured to transmit the generated digital picture of the standard mark to a computing device 216. The computing device 216 may be configured to determine whether the image of the standard mark is located at the center of the image sensor 206, that is, to determine whether the image of the dot or the cross label is at the center of generated digital picture since the center of the image sensor 206 typically is the center of the digital image. In some examples, when the computing device 216 determines that the image of the standard mark is within a threshold distance (e.g., a preset number of pixels) from the center of the digital picture, the computing device 216 may be configured to determine that the optical detector 204 is at an acceptable position at the axis X and the axis Y. The acceptable position at the axis X may be referred to as X optimized position. The acceptable position at the axis Y may be referred to Y optimized position.

On the contrary, when the computing device 216 determines that the image of the standard mark is outside the threshold distance from the center of the digital picture, the computing device 216 may be configured to transmit one or more controlling signals to the multi-axis stage 208 to control the movement of the multi-axis stage 208 at the axis X and the axis Y. Subsequent to the multi-axis stage 208 being controlled to move according to the controlling signals, the optical detector 204 may be configured to generate a second digital picture of the standard mark and transmit the second digital picture to the computing device 216 for similar determination. The process may be repeated until the image of the standard mark is within the threshold distance from the center of the generated digital picture.

With respect to the position of the optical detector 204 at the axis Z, the optical detector 204 may be calibrated to a position that an entrance pupil position of the optical detector 204 is overlapped or closest to an exit pupil position of the optical imaging system 203. The exit pupil position of the optical imaging system 203 may be determined during the optical design process of the optical imaging system 203 prior to the alignment processes described hereafter. Thus, the position of the optical detector 204 may be also predetermined prior to the alignment processes.

When the optical detector 204 is aligned with the beam splitter 212, the computing device 216 may be configured to control the multi-axis controller 104 to adjust the position of the optical lens 210 such that the optical path of the light emitted from optical engine 202 may be adjusted.

Similarly, the optical engine 202 may be configured to display a predetermined pattern, e.g., a crosshair with linewidth of 6 pixels. Light from the displayed pattern may be reflected by the optical lens 210 and the beam splitter 212 to form a virtual image 214. The optical detector 204 may be configured to record a digital image of the virtual image 214 and further transmit the digital image to the computing device 216.

The computing device 216 may be configured to determine whether the center of the virtual image 214, e.g., the center of the crosshair, is at the center of the digital image in order to determine the optimized position of the optical lens 210 at the axis X' and the axis Y'. The determination process at the computing device 216 may be similar to the process described in accordance with FIG. 1B. If the center of the crosshair is not at the center of the digital image, the computing device 216 may be configured to control multi-axis controller 104 to adjust the position of the optical engine 102 at the axis X' and the axis Y' until the center of the crosshair is located with a predetermined threshold distance from the center of the digital image.

Further, when the center of the crosshair is at the center of the digital image, the computing device 216 may be configured to determine whether the two lines of the crosshair are respectively parallel to the edges of the digital image. If not, the computing device 216 may be configured to control the multi-axis controller 104 to rotate the optical lens 210 clockwise or counterclockwise. The rotated degree may be referred to $\theta_{z'}$ optimized position.

Further to the examples, the computing device 216 may be configured to determine the optimized position of the optical lens 210 at the axis Z' based on a virtual image distance. The virtual image distance may refer to the distance between the virtual image 214 and the exit pupil of the optical imaging system. When the multi-axis controller 104 controls the optical lens 210 to move at the axis Z', the virtual image distance may change. Thus, the virtual image distance may be adjusted in different scenarios by controlling the position of the optical lens 210. In some example scenarios, the virtual image distance may be set to 2 to 4 meters. The corresponding position of the optical lens 210 at the axis Z' may be referred to the Z' optimized position. As described above, the virtual image distance may be measured by the optical detector 204. For instance, the computing device 216 may be configured to control the optical detector 204 to change the focus distance from 0.5 meter to infinity by a predetermined step (e.g., 1 centimeter) and to record digital images at each step. Simultaneously, the computing device 216 may be configured to monitor the contrast of the digital image at each step and to determine the focus distance associated with the highest contrast as the virtual image distance.

In addition, the computing device 216 may be configured to control the multi-axis controller 104 to swivel to a $\theta_{x'}$ optimized position and to tilt to a $\theta_{y'}$ optimized position. In more detail, the optical engine 202 may be configured to display a standard pattern, e.g., an image with black and white stripes according to a predetermined spatial frequency. The virtual image 214 of the standard pattern may be captured and recorded by the optical detector 204. The computing device 216 may be configured to calculate contrast values at different regions of a digital image of the virtual image 214. Based on the contrast values at the different regions, the computing device 216 may be configured to generate controlling signals to adjust the position of the optical lens 210 until the contrast values in different regions of the digital image are within a given range. The process for determining the $\theta_{x'}$ optimized position and the $\theta_{y'}$ optimized position is described above in greater detail in accordance with FIG. 1D.

Figure 3:
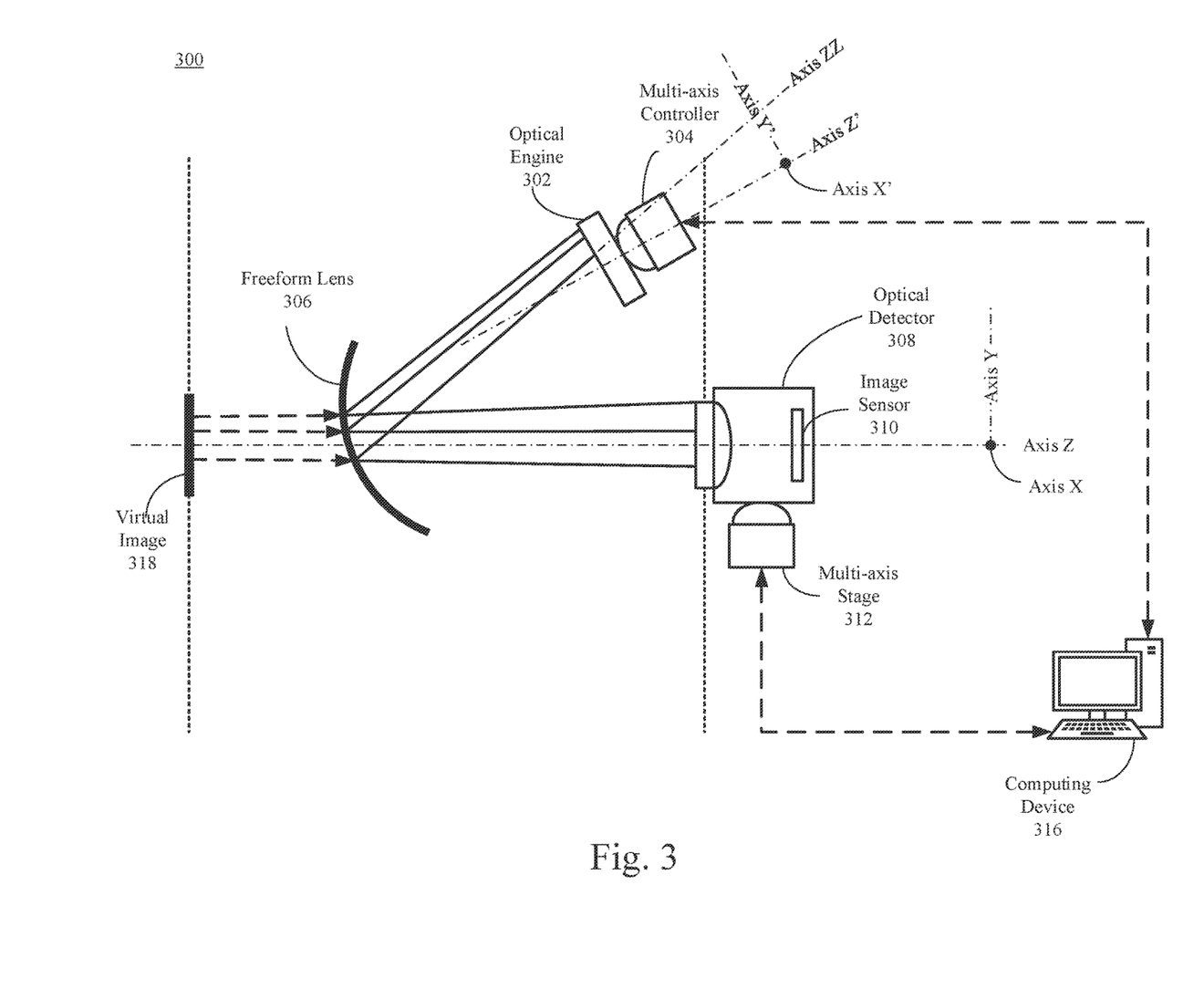
FIG. 3 illustrates another example system in which active alignment for assembling optical imaging systems may be implemented.

FIG. 3 illustrates another example system 300 in which active alignment for assembling optical imaging systems may be implemented.

As depicted, the example system 300 may include an optical engine 302 configured to display one or more patterns, e.g., a crosshair or one or more black and white stripes. The optical engine 302 may also include an LCD panel or an array of OLED to display the patterns. In some examples, the optical engine 302 may be mounted on a multi-axis controller 304. Light from the displayed pattern may reach a freeform lens 306 and be reflected from the freeform lens forming a virtual image 318.

As described above, the multi-axis controller 304 may be configured to move in one or more directions in response to controlling signals from a computing device 216. For example, the multi-axis controller 304 may be configured to move backward and forward at a direction perpendicular to a plane of a micro-display of the optical engine 302, e.g., at an axis Z' as shown. In addition, the multi-axis controller 304 may be configured to move up and down at a direction perpendicular to the direction of the light emitted from the optical engine 302, e.g., at an axis Y'. The multi-axis controller 304 may be further configured to move left and right at a direction perpendicular to both the axis Z' and the axis Y', e.g., at an axis X' shown as a black dot in FIG. 3. Further, the multi-axis controller 304 may be configured to move backward and forward at a direction of the light emitted from the optical engine 302, e.g., at an axis ZZ as shown, by moving at the axis Z' and the axis Y' simultaneously.

Further, the multi-axis controller 304 may be configured to respectively swivel left and right at an angle $\theta_{x'}$ and tilt forward and backward at an angle $\theta_{y'}$. The term "forward" here is defined based on the assumption that an end of the multi-axis controller 304 that is attached to the optical engine 302 is a front end of the multi-axis controller 304. Additionally, the multi-axis controller 304 may be configured to rotate clockwise and counterclockwise for a degree of $\theta_{z'}$.

The example system 300 may further include an optical detector 308 attached to a multi-axis stage 312. Prior to aligning the optical engine 302 with the freeform lens 306, the optical detector 308 may be aligned with the freeform lens 306. That is, a multi-axis stage 312 that carries the optical detector 308 may be configured to move in responses to controlling signals such that the optical detector 308 may be aligned with the freeform lens 306. A combination of the optical engine 302 and the freeform lens 306 may be included in an AR/VR device that may be alternatively referred to as an optical imaging system 303. As the multi-axis stage 312 may be configured to move at one or more directions or at multiple degrees of freedom, aligning the optical detector 308 with the freeform lens 306 may include determining positions of the optical detector 308 at an axis X, an axis Y, and an axis Z respectively and determining the degrees that the multi-axis stage 312 swivels, tilts, and rotates. The axis Z may refer to a direction parallel to an optical axis of the lens included in the optical detector 308. The axis Y may refer to a direction perpendicular to the axis Z and the axis X may refer to a direction perpendicular to both the axis Y and the axis Z.

In some examples for determining the position of the optical detector 308 at the axis X and axis Y, the freeform lens 306 may bear a standard mark, e.g., a dot or a cross label. A real image of the standard mark may be produced at the image sensor 310. The optical detector 308 may be configured to continuously or at least periodically capture the real image and generate a digital picture of the standard mark. The optical detector 308 may be further configured to transmit the generated digital picture of the standard mark to a computing device 316. The computing device 116 may be configured to determine whether the image of the standard mark is located at the center of the image sensor 310, that is, to determine whether the image of the dot or the cross label is at the center of generated digital picture since the center of the image sensor 310 typically is the center of the digital image. In some examples, when the computing device 316 determines that the image of the standard mark is within a threshold distance (e.g., a preset number of pixels) from the center of the digital picture, the computing device 316 may be configured to determine that the optical detector 308 is at an acceptable position at the axis X and the axis Y. The acceptable position at the axis X may be referred to as X optimized position. The acceptable position at the axis Y may be referred to Y optimized position.

On the contrary, when the computing device 316 determines that the image of the standard mark is outside the threshold distance from the center of the digital picture, the computing device 316 may be configured to transmit one or more controlling signals to the multi-axis stage 312 to control the movement of the multi-axis stage 312 at the axis X and the axis Y. Subsequent to the multi-axis stage 312 being controlled to move according to the controlling signals, the optical detector 308 may be configured to generate a second digital picture of the standard mark and transmit the second digital picture to the computing device 316 for similar determination. The process may be repeated until the image of the standard mark is within the threshold distance from the center of the generated digital picture.

With respect to the position of the optical detector 308 at the axis Z, the optical detector 308 may be calibrated to a position that an entrance pupil position of the optical detector 308 is closest to an exit pupil position of the optical imaging system 303 The exit pupil position of the optical imaging system 303 may be determined during the optical design process of the optical imaging system 303 prior to the alignment processes described hereafter. Thus, the position of the optical detector 308 may be also predetermined prior to the alignment processes.

When the optical detector 308 is aligned with the freeform lens 306, the computing device 316 may be configured to control the multi-axis controller 304 to adjust the position of the optical engine 302 such that the optical path of the light emitted from optical engine 302 may be adjusted.

In some examples, the optical engine 302 may be configured to display a predetermined pattern, e.g., a crosshair with linewidth of 6 pixels. Light from the displayed pattern may be reflected by the freeform lens 306 to form a virtual image 318 of the displayed pattern and may further generate an image at the image sensor 310. Similarly, the optical detector 308 may be configured to record a digital image of the virtual image 318 and further transmit the digital image to the computing device 316. The computing device 316 may be configured to determine whether the center of the virtual image 318, e.g., the center of the crosshair, is at the center of the digital image in order to determine the optimized position of the optical engine 302 at the axis X' and the axis Y'. The determination process at the computing device 316 is described above in accordance with FIG. 1B in greater detail. If the center of the crosshair is not at the center of the digital image, the computing device 316 may be configured to control multi-axis controller 304 to adjust the position of the optical engine 302 at the axis X' and the axis Y' until the center of the crosshair is located with a predetermined threshold distance from the center of the digital image.

Further, when the center of the crosshair is at the center of the digital image, the computing device 316 may be configured to determine whether the two lines of the crosshair are respectively parallel to the edges of the digital image. If not, the computing device 316 may be configured to control the multi-axis controller 304 to rotate the optical engine 302 clockwise or counterclockwise. The rotated degree may be referred to $\theta_{z'}$ optimized position.

Further to the examples, the computing device 316 may be configured to determine the optimized position of the optical engine 302 at the axis ZZ based on a virtual image distance. The virtual image distance may refer to the distance between the virtual image 318 and the exit pupil of the optical imaging system 303. When the multi-axis controller 304 controls the optical engine 302 to move at the axis ZZ, the virtual image distance may change. Thus, the virtual image distance may be adjusted in different scenarios by controlling the position of the optical engine 302. In some example scenarios, the virtual image distance may be set to 2 to 4 meters. The corresponding position of the optical engine 302 at the axis ZZ may be referred to the ZZ optimized position. In some examples, the virtual image distance may be measured by the optical detector 308. For instance, the computing device 316 may be configured to control the optical detector 308 to change the focus distance from 0.5 meter to infinity by a predetermined step (e.g., 1 centimeter) and to record digital images at each step. Simultaneously, the computing device 316 may be configured to monitor the contrast of the digital image at each step and to determine the focus distance associated with the highest contrast as the virtual image distance.

In addition, the computing device 316 may be configured to control the multi-axis controller 304 to swivel to a $\theta_{x'}$ optimized position and to tilt to a $\theta_{y'}$ optimized position. In more detail, the optical engine 302 may be configured to display a standard pattern, e.g., an image with black and white stripes according to a predetermined spatial frequency. The virtual image 318 of the standard pattern may be captured and recorded by the optical detector 308. The computing device 316 may be configured to calculate contrast values at different regions of a digital image of the virtual image 318. Based on the contrast values at the different regions, the computing device 316 may be configured to generate controlling signals to adjust the position of the optical engine 302 until the contrast values in different regions of the digital image are within a given range. The process for determining the $\theta_{x'}$ optimized position and the $\theta_{y'}$ optimized position is described above in greater detail in accordance with FIG. 1D.

Figure 4:
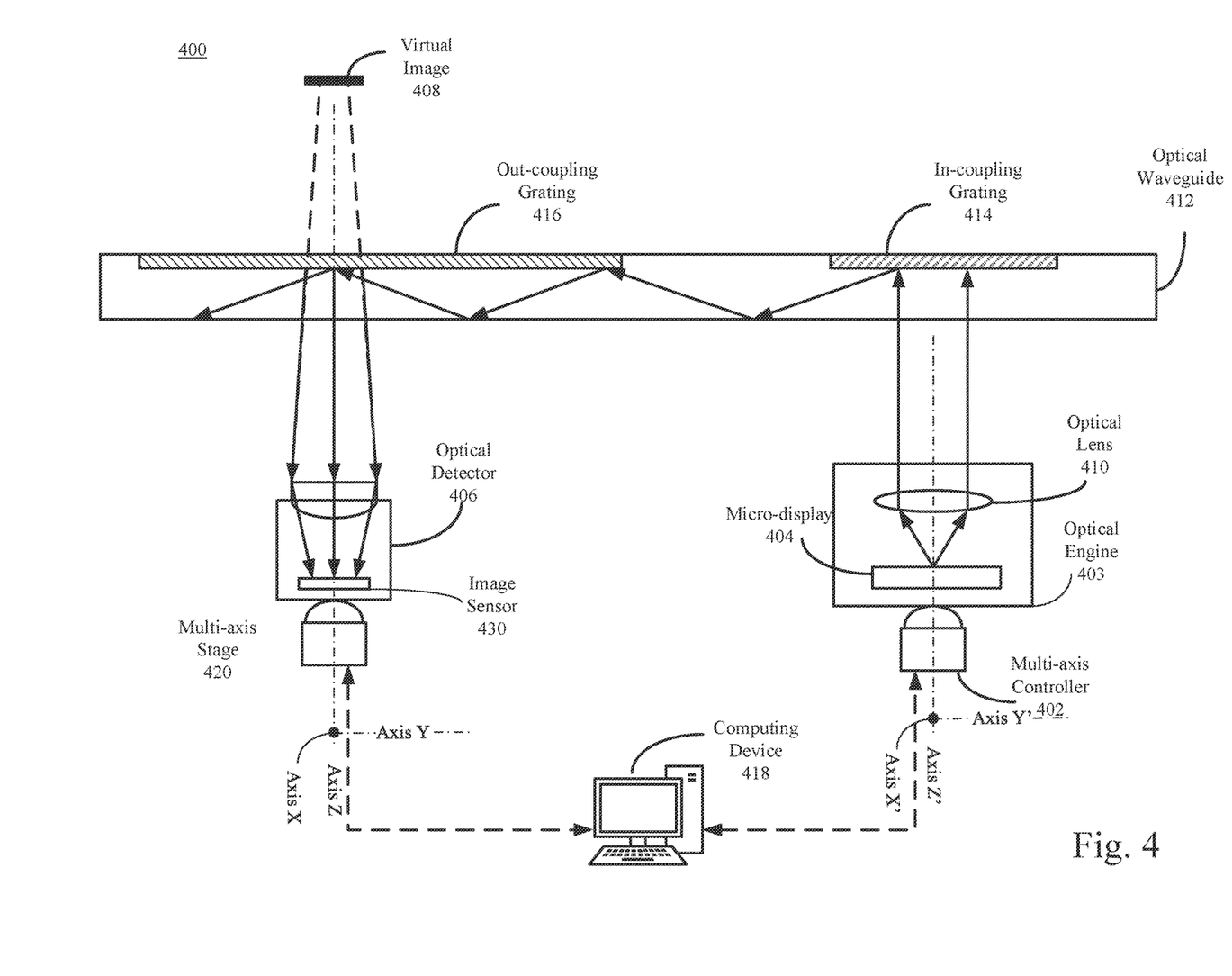
FIG. 4 illustrates another example system in which active alignment for assembling optical imaging systems may be implemented.

FIG. 4 illustrates another example system in which active alignment for assembling optical imaging systems may be implemented.

As depicted, the example system 400 may include an optical engine 403 mounted to a multi-axis controller 402. The optical engine 403 may include a micro-display 404 and an optical lens 410. The micro-display 404 may include a DLP projector or LCOS micro-display, or an OLED display, or a laser MEMS scanner that may be configured to display one or more patterns. For example, the patterns may include an image of multiple black and white stripes or an image of a crosshair.

Similarly, the multi-axis controller 402 may refer to a motorized stage that may be configured to move in one or more directions in response to controlling signals from a computing device 418. In other words, the multi-axis controller 402 may have one or more degrees of freedom (DOF). For example, the multi-axis controller 402 may be configured to move backward and forward at a direction of the light emitted from the micro-display 404, e.g., at an axis Z' as shown. In addition, the multi-axis controller 402 may be configured to move up and down at a direction perpendicular to the direction of the light emitted from the micro-display 404, e.g., at an axis Y'. The multi-axis controller 402 may be further configured to move left and right at a direction perpendicular to both the axis Z' and the axis Y', e.g., at an axis X' shown as a black dot in FIG. 4.

Further, the multi-axis controller 402 may be configured to respectively swivel left and right at an angle $\theta_{x'}$ and tilt forward and backward at an angle $\theta_{y'}$. The term "forward" here is defined based on the assumption that an end of the multi-axis controller 402 that is attached to the micro-display 404 is a front end of the multi-axis controller 402. Additionally, the multi-axis controller 402 may be configured to rotate clockwise and counterclockwise for a degree of $\theta_{z'}$.

The example system 400 may further include an optical waveguide 412 with an in-coupling grating 414 and an out-coupling grating 416 embedded therein and an optical detector 406 attached to a multi-axis stage 420. A combination of the optical engine 403, the optical lens 410, the optical waveguide 412 may be included in an AR/VR device that may be alternatively referred to as an optical imaging system 401. Prior to aligning the optical engine 403 with the optical waveguide 412, the optical detector 406 may be aligned with the out-coupling grating 416. As the multi-axis stage 420 may be configured to move at one or more directions or at multiple degrees of freedom, aligning the optical detector 406 with the out-coupling grating 416 may include determining positions of the optical detector 406 at an axis X, an axis Y, and an axis Z respectively and determining the degrees that the multi-axis stage 420 swivels, tilts, and rotates. The axis Z may refer to a direction parallel to an optical axis of the lens included in the optical detector 406. The axis Y may refer to a direction perpendicular to the axis Z and the axis X may refer to a direction perpendicular to both the axis Y and the axis Z.

In some examples for determining the position of the optical detector 406 at the axis X and axis Y, a mount that supports the optical waveguide 412 may bear a standard mark, e.g., a dot or a cross label. A real image of the standard mark may be produced at an image sensor 430 of the optical detector 406. The optical detector 406 may be configured to continuously or at least periodically capture the real image and generate a digital picture of the standard mark. The optical detector 406 may be further configured to transmit the generated digital picture of the standard mark to a computing device 418. The computing device 418 may be configured to determine whether the image of the standard mark is located at the center of the image sensor 430, that is, to determine whether the image of the dot or the cross label is at the center of generated digital picture since the center of the image sensor 430 typically is the center of the digital image. In some examples, when the computing device 418 determines that the image of the standard mark is within a threshold distance (e.g., a preset number of pixels) from the center of the digital picture, the computing device 418 may be configured to determine that the optical detector 406 is at an acceptable position at the axis X and the axis Y. The acceptable position at the axis X may be referred to as X optimized position. The acceptable position at the axis Y may be referred to Y optimized position.

On the contrary, when the computing device 418 determines that the image of the standard mark is outside the threshold distance from the center of the digital picture, the computing device 418 may be configured to transmit one or more controlling signals to the multi-axis stage 420 to control the movement of the multi-axis stage 420 at the axis X and the axis Y. Subsequent to the multi-axis stage 420 being controlled to move according to the controlling signals, the optical detector 406 may be configured to generate a second digital picture of the standard mark and transmit the second digital picture to the computing device 418 for similar determination. The process may be repeated until the image of the standard mark is within the threshold distance from the center of the generated digital picture.

With respect to the position of the optical detector 406 at the axis Z, the optical detector 406 may be calibrated to a position that an entrance pupil position of the optical detector 406 is overlapped or closest to the exit pupil of the optical imaging system 401. The exit pupil position of the optical imaging system 401 may be determined during the optical design process of the optical imaging system 401 prior to the alignment processes described hereafter. Thus, the position of the optical detector 406 may be also predetermined prior to the alignment processes.

When the optical detector 406 is aligned with the out-coupling grating 416, the computing device 418 may be configured to control the multi-axis controller 402 to adjust the position of the optical engine 403 such that the optical path of the light emitted from optical engine 403 may be adjusted.

In some examples, the computing device 418 may be configured to adjust a distance between the optical lens 410 and the micro-display 404 to modify a virtual image distance. The virtual image distance may refer to the distance between the virtual image 408 and the exit pupil of the optical imaging system 401. The exit pupil position of the optical imaging system 401 may be determined during the optical design process of the optical imaging system 401 prior to the alignment processes described hereafter. When the distance between the the optical lens 410 and the micro-display 404 changes, the virtual image distance may change correspondingly. In some example scenarios, the virtual image distance may be set to 2 to 4 meters.

In some examples, the virtual image distance may be measured by the optical detector 406. For instance, the computing device 418 may be configured to control the optical detector 406 to change the focus distance from 0.5 meter to infinity by a predetermined step (e.g., 1 centimeter) and to record digital images at each step. Simultaneously, the computing device 418 may be configured to monitor the contrast of the digital image at each step and to determine the focus distance associated with the highest contrast as the virtual image distance.

In some examples, the micro-display 404 may be configured to display a predetermined pattern, e.g., a crosshair with linewidth of 6 pixels. Light from the displayed pattern may be reflected by the in-coupling grating 414, travel within the optical waveguide 412, and reach the out-coupling grating 416. The light may be further reflected by the out-coupling grating 416 and reach the optical detector 406 forming a virtual image 408.

Similarly, the optical detector 406 may be configured to record a digital image of the virtual image 408 and further transmit the digital image to the computing device 418. The computing device 418 may be configured to determine whether the center of the virtual image 408, e.g., the center of the crosshair, is at the center of the digital image in order to determine the optimized positions of the optical engine 403 at the angle $\theta_{x'}$ and the angle $\theta_{y'}$. If the center of the crosshair is not at the center of the digital image, the computing device 418 may be configured to control multi-axis controller 402 to adjust the optical engine 403 at the angle $\theta_{x'}$ and the angle $\theta_{y'}$ until the center of the crosshair is located with a predetermined threshold distance from the center of the digital image.

Further, when the center of the crosshair is at the center of the digital image, the computing device 418 may be configured to determine whether the two lines of the crosshair are respectively parallel to the edges of the digital image. If not, the computing device 418 may be configured to control the multi-axis controller 402 to rotate the optical engine 403 clockwise or counterclockwise. The rotated degree may be referred to a $\theta_{z'}$ optimized position.

Further, the computing device 418 may be configured to control the multi-axis controller 402 to move at the axis X' and the axis Y' to maximize the brightness of the digital image. The brightness of the digital image may refer to a brightness value of a particular portion of the digital image or an averaged brightness of the entire digital image. In at least some examples, the computing device 418 may be configured to control the multi-axis controller 402 to move at the axis X' and the axis Y' within a predetermined range (e.g., 5 mm×5 mm). The optical detector 406 may be configured to continuously monitor the brightness of the digital image. The position of the optical engine 403 that corresponds to a highest brightness of the digital image may be determined by the computing device 418 to be the optimized position at the axis X' and the axis Y'.

In addition, the computing device 418 may be configured to control the multi-axis controller 402 to further calibrate the $\theta_{x'}$ optimized position and the $\theta_{y'}$ optimized position to achieve optimized color uniformity. In more detail, the micro-display 404 may be configured to display a standard pattern, e.g., an image with black and white stripes according to a predetermined spatial frequency. The virtual image 408 of the standard pattern may be captured and recorded by the optical detector 406. The computing device 418 may be configured to calculate contrast values at different regions of a digital image of the virtual image 408. Based on the contrast values at the different regions, the computing device 418 may be configured to generate controlling signals to adjust the position of the optical engine 403 at the angle $\theta_{x'}$ and the angle $\theta_{y'}$ until the contrast values in different regions of the digital image are within a given range.

Figure 5:
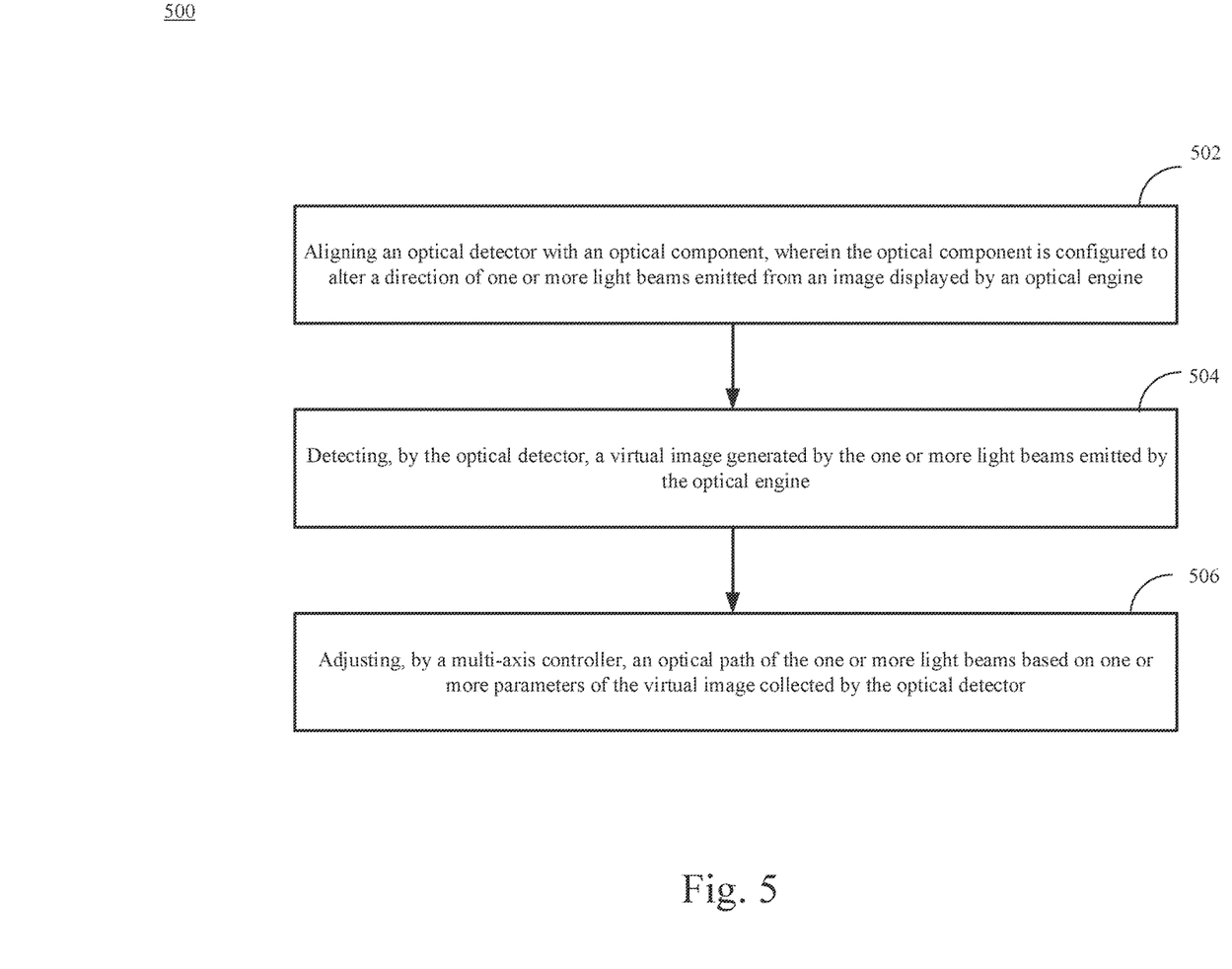
FIG. 5 illustrates a flow chart of an example method for active alignment for assembling optical imaging systems.

FIG. 5 illustrates a flow chart of an example method 500 for active alignment for assembling optical imaging systems.

At block 502, the example method 500 may include aligning an optical detector with an optical component, wherein the optical component is configured to alter a direction of one or more light beams emitted from an image displayed by an optical engine.

For example, as shown in FIG. 1A, the multi-axis stage 112 may be configured to align the optical detector 108 with the optical component 106 in response to controlling signals from the computing device 116.

As depicted in FIG. 2, the multi-axis stage 208 may be configured to align the optical detector 204 with the beam splitter 212 in response to the controlling signals from the computing device 216.

As depicted in FIG. 3, the multi-axis stage 312 may be configured to align the optical detector 308 with the free-form lens 306 in response to the controlling signals from the computing device 316.

As depicted in FIG. 4, the multi-axis stage 420 may be configured to align the optical detector 406 with the out-coupling grating 416 in response to the controlling signals from the computing device 418.

At block 504, the example method 500 may include detecting, by the optical detector, a virtual image generated by the one or more light beams emitted by the optical engine.

For example, as shown in FIG. 1A, the optical detector 108 may be configured to detect and capture the virtual image 107 generated by the light beams emitted by the optical engine 102.

As depicted in FIG. 2, the optical detector 204 may be configured to detect and capture the virtual image 214 generated by the light beams emitted by the optical engine 202.

As depicted in FIG. 3, the optical detector 308 may be configured to detect and capture the virtual image 318 generated by the light beams emitted by the optical engine 302.

As depicted in FIG. 4, the optical detector 406 may be configured to detect and capture the virtual image 408 generated by the light beams emitted by the micro-display 404.

At block 506, the example method 500 may include adjusting, by a multi-axis controller, an optical path of the one or more light beams based on one or more parameters of the virtual image collected by the optical detector.

For example, as shown in FIG. 1A, the computing device 116 may be configured to send controlling signals to the multi-axis controller 104 to adjust the position of the multi-axis controller 104 in order to adjust the optical path of the light based on the digital image capture by the optical detector 108. In more detail, the computing device 116 may be configured to determine whether the center of the virtual image 107, e.g., the center of the crosshair, is at the center of the digital image in order to determine the optimized position of the optical engine 102 at the axis X' and the axis Y'. Further, the computing device 116 may be configured to determine whether the two lines of the crosshair are respectively parallel to the edges of the digital image. If not, the computing device 116 may be configured to control the multi-axis controller 104 to rotate the optical engine 102 clockwise or counterclockwise.

The computing device 116 may be configured to calculate contrast values at different regions of a digital image of the virtual image 107. Based on the contrast values at the different regions, the computing device 116 may be configured to generate controlling signals to adjust the position of the optical engine 102 until the contrast values in different regions of the digital image are within a given range. The process for determining the $\theta_{x'}$ optimized position and the $\theta_{y'}$ optimized position is described in greater detail in accordance with FIG. 1D.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. A method of active alignment for assembling optical imaging systems, comprising:
   aligning an optical detector with an optical component, wherein the optical component is configured to alter a direction of one or more light beams emitted from an image displayed by an optical engine, wherein the optical component is a beam splitter attached to a reflective optical lens;
   detecting, by the optical detector, a virtual image generated by the one or more light beams emitted by the optical engine; and
   adjusting, by a multi-axis controller, an optical path of the one or more light beams based on one or more parameters of the virtual image collected by the optical detector, wherein the adjusting the optical path includes adjusting a position of the reflective optical lens and the beam splitter relative to the optical engine based on a difference between a center of the virtual image and a center of an image sensor of the optical detector.

2. The method of claim 1, wherein the aligning the optical detector with the optical component includes adjusting a position of the optical detector until a real image of a standard object is centered at an image sensor of the optical detector.

3. The method of claim 1, wherein the optical detector is attached to a multi-axis stage that is moveable at one or more directions.

4. The method of claim 1, wherein the adjusting the optical path includes adjusting a position of the reflective optical lens and the beam splitter relative to the optical engine based on the one or more parameters of the virtual image collected by the optical detector, wherein the one or more parameters include a contrast of at least a portion of the virtual image.

5. A system of active alignment for assembling optical imaging systems, comprising:
   an optical engine configured to display an image;
   an optical component configured to alter a direction of one or more light beams emitted from the image, wherein the optical component is a beam splitter attached to a reflective optical lens;
   an optical detector aligned with at least one component of the optical system, wherein the optical detector is configured to detect a virtual image generated by the one or more light beams emitted by the optical engine; and
   a multi-axis controller configured to adjust an optical path of the one or more light beams based on one or more parameters of the virtual image collected by the optical detector, wherein the multi-axis controller is configured to adjust a position of the reflective optical lens and the beam splitter relative to the optical engine based on a difference between a center of the virtual image and a center of an image sensor of the optical detector.

6. The system of claim 5, wherein the optical detector is attached to a multi-axis stage configured to adjust a position of the optical detector until a real image of a standard object is centered at an image sensor of the optical detector.

7. The system of claim 5, wherein the multi-axis controller is configured to adjust a position of the reflective optical lens and the beam splitter relative to the optical engine based on the one or more parameters of the virtual image collected by the optical detector, wherein the one or more parameters include a contrast of at least a portion of the virtual image.

* * * * *